United States Patent [19]

Nanao

[11] 4,375,821
[45] Mar. 8, 1983

[54] CONTROL VALUE

[75] Inventor: Teruaki Nanao, Yahata, Japan

[73] Assignee: Kubota, Ltd., Osaka, Japan

[21] Appl. No.: 225,439

[22] Filed: Jan. 15, 1981

[30] Foreign Application Priority Data

Jan. 25, 1980 [JP] Japan ................... 55-7952

[51] Int. Cl.³ .................. F16K 1/54; B08B 3/04; F16K 3/26
[52] U.S. Cl. .................. 137/239; 137/625.3; 137/625.38; 137/625.39; 138/45; 138/46; 251/120; 251/205; 251/210; 251/121
[58] Field of Search ......... 137/239, 625.33, 625.69, 137/625.39, 238, 625.68, 625.38, 625.3; 251/120, 121, 127, 210, 205; 210/411, 427, 429; 138/45, 46

[56] References Cited

U.S. PATENT DOCUMENTS

| | | | |
|---|---|---|---|
| 1,148,689 | 8/1915 | Kepple | 210/411 |
| 1,802,897 | 4/1931 | Holden et al. | 251/210 |
| 2,275,958 | 3/1942 | Hagel | 210/411 |
| 2,372,920 | 4/1945 | Wiles | 137/239 |
| 2,601,231 | 6/1952 | Smith et al. | 137/625.33 |
| 2,748,948 | 6/1956 | Fricke et al. | 210/411 |
| 3,367,506 | 2/1968 | Roasen | 210/411 |
| 3,821,968 | 7/1974 | Barb | 137/625.3 |
| 4,024,891 | 5/1977 | Engel et al. | 137/625.38 |
| 4,036,248 | 7/1977 | Yoshimori et al. | 137/625.38 |
| 4,271,019 | 6/1981 | Galletti | 210/411 |
| 4,276,906 | 7/1961 | Eguchi | 137/625.38 |

*Primary Examiner*—George L. Walton
*Attorney, Agent, or Firm*—Cushman, Darby & Cushman

[57] ABSTRACT

A valve adapted to control liquid pressure by sliding within a valve housing a bottomed tubular valve closure member having a porous peripheral wall. The pores are subjected to reverse flush by moving the valve closure member to a closed position and also by closing an open end of the valve closure member. The valve housing includes a passage for discharging the liquid from the valve at times of the reverse flush.

4 Claims, 2 Drawing Figures

CONTROL VALUE

BACKGROUND OF THE INVENTION

(1) Field of the Invention

This invention relates to a valve comprising a valve housing including a partition defining an opening, and a tubular valve closure member slidably mounted in the opening and having an open end, a closed end and a peripheral wall defining a plurality of pores, the valve closure member being slidable to control pressure of liquid flowing from a space upstream of the partition to a space downstream thereof through the pores and to shut the opening with the closed end.

(2) Description of the Prior Art

The valve of the prior art has the disadvantage that, in normal use for controlling liquid pressure as the liquid passes through the pores defined in the peripheral wall of the valve closure member, foreign matter in the liquid gradually accumulates around the pores thereby clogging them. A well known method of removing such foreign matter clogging the pores is to apply a reverse flush, that is to wash the foreign out of the pores by causing a reverse flow of the liquid therethrough. Generally this reverse flush is effected by reversing the liquid flow in the main pipeline in which the valve is installed thereby to washing the clogging out of the pores. The matters thus suspended in the liquid is then carried downstream. However, this method has a possibility of raising downstream pressure at the time of reverse flushing.

Another known method is to take the valve closure member out of the valve housing so that the clogged pores can be washed. However this known method has certain disadvantages, such as, the necessity of stopping flow in the main pipeline, and the time and trouble necessary to disassemble and assemble the valve.

A further method is to provide a strainer upstream of the valve closure member in order to filter out foreign matter present in the liquid before they reach the valve, the strainer being removable from the valve housing for cleaning. This method again has the disadvantage of requiring an additional element, the strainer, and the trouble of removing it from and mounting it into the valve housing.

SUMMARY OF THE INVENTION

The object of this invention is to alleviate the disadvantages of the known art of dealing with the clogging in the valve closure member of the described valve and to provide a simple construction effective to remove clogging matter thereby allowing the valve to perform its pressure regulating function well.

A valve according to this invention comprises a valve housing including a partition defining an opening, and a tubular valve closure member slidably mounted in the opening and having an open end, a closed end and a peripheral wall defining a plurality of pores, the valve closure member being slidable to control pressure of liquid flowing from a space upstream of the partition to a space downstream thereof through the pores and to shut the opening with the closed end, characterized in that the valve further comprises means to cause the liquid to flow through the pores in reverse to the normal pressure-controlled flow to provide reverse flush for the pores when the valve closure member is in a position to shut the opening with the closed end and to place the peripheral wall in the upstream space and shut the open end, the valve housing including passage means to discharge the liquid in the valve out of the valve housing at times of the reverse flush.

It will be seen that the invention makes effective use of the basic construction of the conventional valve and provides means to remove the foreign matter clogging the pores of the valve closure member as the valve closure member slides from a normal position for flow pressure control to a position for reverse flush. Therefore, the invention has the advantage of eliminating the clogging by a simple construction and without requiring a strainer. Moreover, the invention provides the passage which opens at times of the reverse flush to discharge the dislodged foreign matter out of the valve housing. This construction has a great advantage of avoiding repeated clogging and trouble in piping which have heretofore been caused by the foreign matter remaining in the liquid. Thus the valve according to this invention performs the pressure regulating function well.

This invention is applicable to various pipelines such as those for city water service or for industrial water supply. The invention is particularly advantageous in application to pipelines or waterways transmitting liquids containing a large quantity of foreign matter such as dam water and water for agricultural use.

BRIEF DESCRIPTION OF THE DRAWINGS

The drawings illustrate a valve according to this invention, in which.

DESCRIPTION OF THE PREFERRED EMBODIMENT

Figure 1:
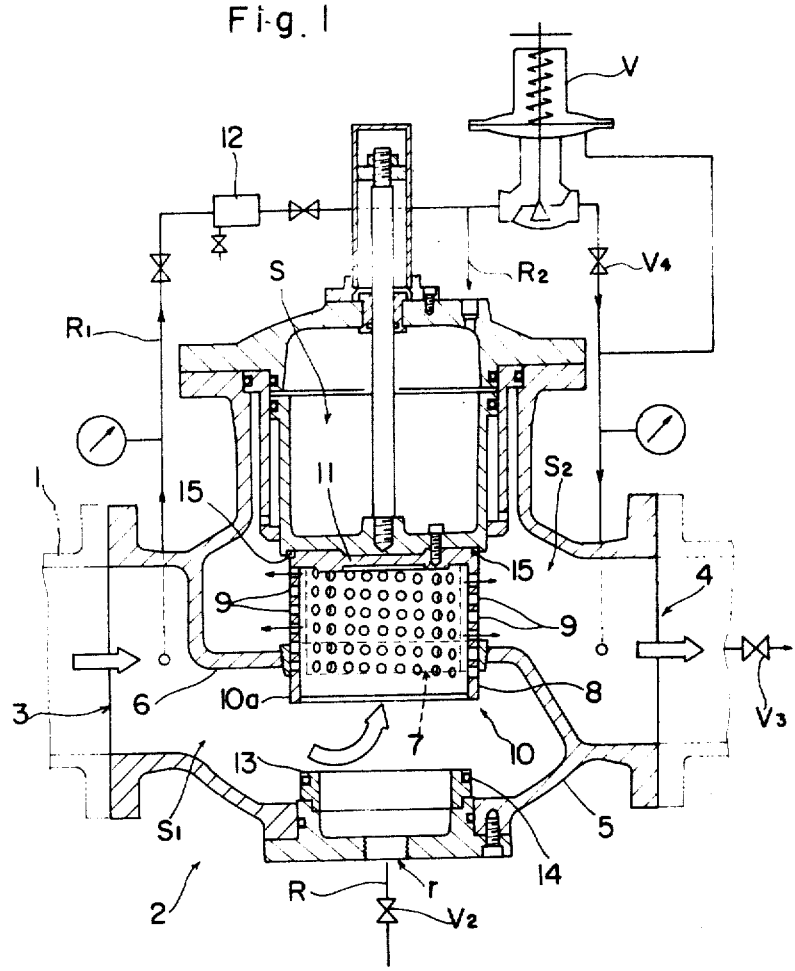
FIG. 1 is a vertical section of the valve in a normal open position.
Figure 2:
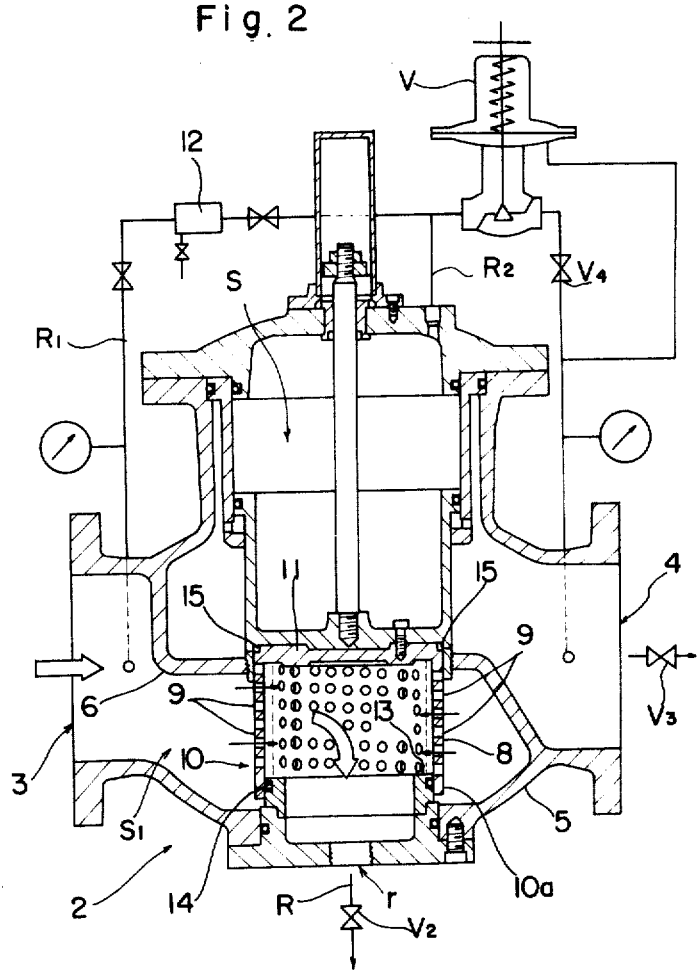
FIG. 2 is a vertical section of the valve in a reverse flush position.

A liquid transmitting pipeline 1 has a valve 2 mounted at an intermediate portion thereof for pressure regulating purposes. The valve 2 comprises a valve housing 5 flange coupled to the pipeline 1 and having an inlet 3 and an outlet 4. The valve housing 5 includes a partition 6 dividing its interior into an upstream space S1 and a downstream space S2. The partition 6 has an opening 7 to receive a bottomed tubular valve closure member 10 slidably mounted with the bottomed or closed end 11 up and an open end 10a down, the valve closure member 10 having a peripheral wall 8 formed with a plurality of helically arranged pores 9. The valve closure member 10 is vertically slidable under pressure of the flowing liquid to vary the number of pores 9 providing communication between the upstream space S1 and the downstream space S2, to automatically regulate the pressure of the liquid flow.

Opposite positions of the valve housing 5 across the valve closure member 10 are in communication by way of a bypass passage R1. A further passage R2 extends from a position of the bypass passage R1 upstream of a pilot valve V operable by the downstream fluid pressure to a pressurizing space S defined upwardly of the closed end 11 of the valve closure member 10. The pilot valve V closes when the downstream pressure exceeds a predetermined value, whereby part of the liquid is delivered through the bypass passage R1 to the pressurizing space S to cause automatic downward sliding of the valve closure member 10 to regulate the pressure. When the downstream pressure is below the predetermined value, the pilot valve V opens to permit escape of the pressure in the pressurizing space S by way of the bypass passage R2 thereby causing automatic upward sliding of the valve closure member 10 to regulate the pressure. Number 12 in the drawings indicates a strainer.

When the valve closure member 10 is in the lowermost position (See FIG. 22), its closed end 11 closes the opening 7 and its open end 10a fits on a tubular portion 13 provided on the bottom of the valve housing 5. A passage R having a valve V2 is connected to the valve housing 5 to discharge the liquid from the valve when the open end 10a is fitted on the tubular portion 13. By closing a valve V3 mounted at a downstream position of the pipeline 1 or a throttle valve V4, part of the liquid is fed into the pressurizing space S through the bypass passage R1 to slide the valve closure member 10 to the lowermost position. At this time the liquid flow relative to the pores 9 is reversed for the reverse flush condition in which the liquid flows through the pores 9 from outside to inside of the valve closure member 10. By opening the valve V2, the reverse flush removes the foreign clogging the pores 9 and discharges the liquid entrained foreign matter outside the valve housing 5 by way of the passage R connected to a bore r defined in the bottom of the valve housing 5.

The tubular portion 13 is provided with an elastic sealing ring 14 on an outer periphery thereof which engages the valve closure member 10. This provision permits no liquid flow between the tubular portion 13 and the valve closure member 10 during periods of reverse flushing, and contributes toward excellent clog clearing. Number 15 indicates another elastic sealing ring provided peripherally of the valve closure member 10 at the closed end 11 to provide a complete sealing between the valve closure member 10 and the inner circle of the partition 6 defining the opening 7 when the valve closure member 10 is at the lowermost position.

It is in accordance with this invention to mount the elastic sealing ring 14 on an inner face of the peripheral wall 8 of the valve closure member 10 or to dispense with the elastic sealing ring 14. Instead of providing the tubular portion 13, the open end 10a of the valve closure member 10 may abut against the inner wall of the valve housing 5.

While in the described embodiment the pressure of the flowing liquid is utilized to slide the valve closure member 10 vertically to regulate the pressure, the vertical sliding may be effected by other drive means or manually.

I claim:

1. A control valve comprising:

a valve housing defining an interior space;

a partition defining an opening and dividing said interior space of said valve housing into an upstream space and a downstream space;

a valve closure member slidably mounted in said opening and including a closed end reciprocable within said downstream space between an uppermost position and said partition, and a peripheral wall integral with said closed end defining a plurality of pores, and an open end opposite said closed end being reciprocable only within said upstream space between said partition and a lowermost position so as to control fluid flow through said valve according to the number of said pores positioned in said downstream space;

an inlet defined in said housing in fluid communication with said upstream space;

an outlet defined in said housing in fluid communication with said downstream space, said upstream and downstream spaces being in normal fluid communication by virtue of said opening, the liquid normally flowing in a direction from the inlet through said open end thereby passing through said pores from the interior of said closure member to the exterior thereof; and a discharge bore formed in the valve housing in fluid communication with said upstream space and being tightly surrounded by the open end of said closure member when in said lowermost position so as to close said partition opening with said closed end thereby preventing fluid communication between said upstream and downstream spaces and reversing fluid flow through said closure member by effecting fluid flow in a direction from said inlet through said pores from the exterior of said closure member to the interior thereof.

2. A valve as claimed in claim 1 wherein said valve housing includes a tubular portion to fit with said valve closure member at said open end at times of said reverse flush.

3. A valve as claimed in claim 1 further comprising passage means connected to said discharge bore defined in a bottom of said valve housing, said passage means having a valve to control the liquid discharge.

4. A control valve comprising:

a valve body having an interior space and including inlet and outlet openings for permitting fluid to normally flow therebetween, and a discharge opening;

partition means for separating said interior space into an upstream space including said inlet and discharge openings, and a downstream space including said outlet opening, said partition means including port means defining a port thereby establishing a path of fluid communication between said upstream and downstream spaces through said partition means;

plug means defining a plurality of apertures and having an open end and a closed end, said plug means being slideably receivable in said port means and reciprocably operable between an open position whereby said fluid normally flows from said inlet opening to said outlet opening through predetermined ones of said apertures in a first direction defined by said fluid initially flowing into the interior of said plug means through said open end and thereafter flowing through said apertures to the exterior of said plug means, and a closed position wherein said closed end sealingly closes said port means whereby said fluid flows from said inlet opening to said discharge opening through said apertures in a second reverse direction defined by said fluid initially flowing through said apertures from the exterior of said plug means to the interior thereof and thereafter flowing through said open end so that upon operation of said plug means to said closed position, foreign matter which may have accumulated in said apertures when said fluid flows in said first direction is forceably removed therefrom by virtue of said fluid flowing in said second reverse direction and expelled into said discharge opening.

* * * * *